United States Patent
Matsuura

(10) Patent No.: US 7,327,100 B2
(45) Date of Patent: Feb. 5, 2008

(54) DISCHARGE LAMP LIGHTING APPARATUS

(75) Inventor: Ken Matsuura, Chuo-ku (JP)

(73) Assignee: TDK Corporation, Tokyo (JP)

( * ) Notice: Subject to any disclaimer, the term of this patent is extended or adjusted under 35 U.S.C. 154(b) by 13 days.

(21) Appl. No.: 11/388,996

(22) Filed: Mar. 27, 2006

(65) Prior Publication Data
US 2006/0214604 A1   Sep. 28, 2006

(30) Foreign Application Priority Data
Mar. 28, 2005   (JP) .............................. 2005-091054

(51) Int. Cl.
*H05B 41/36* (2006.01)
(52) U.S. Cl. ...................................... 315/307; 315/291
(58) Field of Classification Search ............ 315/209 R, 315/291, 307, 224, 312, 246, 247, 308
See application file for complete search history.

(56) References Cited

U.S. PATENT DOCUMENTS

| | | | | |
|---|---|---|---|---|
| 5,134,345 A | * | 7/1992 | El-Hamamsy et al. ...... | 315/248 |
| 6,483,260 B1 | * | 11/2002 | Flory, IV .................... | 315/325 |
| 6,972,531 B2 | * | 12/2005 | Krummel .................... | 315/309 |
| 7,081,709 B2 | * | 7/2006 | Pak ............................ | 315/101 |
| 2006/0170377 A1 | * | 8/2006 | Nakanishi .................... | 315/307 |

FOREIGN PATENT DOCUMENTS

JP   A 2004-241136   8/2004

* cited by examiner

*Primary Examiner*—Douglas W. Owens
*Assistant Examiner*—Jimmy Vu
(74) *Attorney, Agent, or Firm*—Oliff & Berridge PLC

(57) ABSTRACT

A discharge lamp lighting apparatus for lighting a discharge lamp having two electrodes includes a first drive circuit, a second drive circuit, and a control circuit. The first drive circuit is connectable to one of the two electrodes to supply a first alternating current to the discharge lamp. The first alternating current has a frequency. The second drive circuit is connectable to the other of the two electrodes to supply a second alternating current to the discharge lamp. The second alternating current has the same frequency as the first alternating current. The control circuit generates first and second drive pulses to drive the first and second drive circuits, respectively. The control circuit has a current detecting circuit and a phase difference adjuster. The current detecting circuit detects the first and second alternating currents separately. The phase difference adjuster adjusts a phase difference between the first and second drive pulses so that an amount of the first alternating current is identical to an amount of the second alternating current.

2 Claims, 6 Drawing Sheets

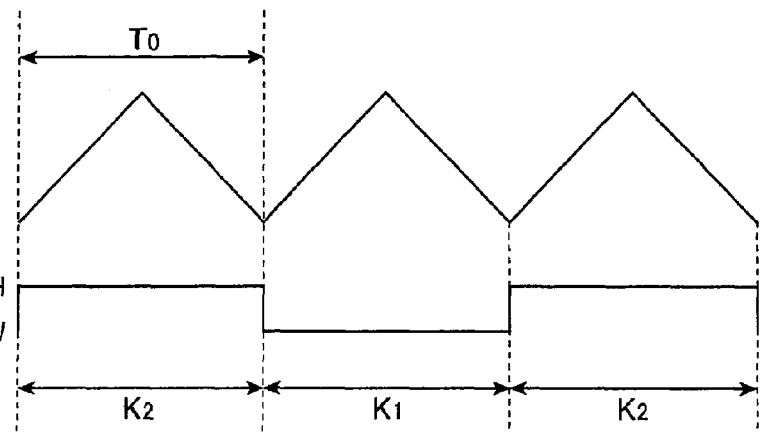
FIG.6A RAMP
FIG.6B T

DISCHARGE LAMP LIGHTING APPARATUS

BACKGROUND OF THE INVENTION

1. Technical Field

The present invention relates to a discharge lamp lighting device that controls a discharge lamp having two electrodes. In particular, the present invention relates to a discharge lamp lighting device that controls a discharge lamp used as a backlight for various display panels such as big screen television sets.

2. Related Art

Recently, a cold-cathode fluorescent lamp (designated as "CCFL" hereinafter) used as a backlight for a liquid crystal panel is prone to be long, since the liquid crystal panel is becoming larger in size. When a high voltage is applied across the CCFL through one electrode thereof to light up the CCFL, the CCFL may have non-uniform brightness along the longitudinal direction thereof.

Japanese Patent Application Publication 2004-241136 discloses a discharge lamp lighting device including a pair of inverter circuits, in which one of the inverter circuits as a master inverter circuit is connected to one of two electrodes of the lamp, and the other inverter circuit as a slave inverter circuit is connected to the other electrode of the lamp. The lamp is lighted up by applying a high voltage across the lamp through each of the electrodes. This method of lighting the lamp is designated as "a differential drive method".

However, characteristics of the master inverter circuit and the slave inverter circuit do not always coincide with each other. Therefore, currents supplied from the inverter circuits may become unbalanced even if the same voltage is applied across the respective inverter circuits to light up the CCFL by the differential drive method.

Accordingly, a method is suggested to adjust duties of output voltages supplied from the two inverter circuits, respectively, to equalize the amounts of currents from the two inverter circuits. However, when this method is employed, the duties of the inverters are generally different from each other. Therefore, the inverter circuit which generates a larger duty pulse is required to have a larger derating, which raises a problem against downsizing of the discharge lamp lighting device.

To overcome the above-mentioned drawbacks, an object of the present invention is to provide a discharge lamp lighting device that can easily equalize amounts of currents flowing into a discharge lamp through each of two inverter circuits.

SUMMARY

The present invention provides a discharge lamp lighting apparatus for lighting a discharge lamp having two electrodes, having a first drive circuit, a second drive circuit, and a control circuit. The first drive circuit is connectable to one of the two electrodes to supply a first alternating current to the discharge lamp. The first alternating current has a frequency. The second drive circuit is connectable to the other of the two electrodes to supply a second alternating current to the discharge lamp. The second alternating current has the same frequency as the first alternating current. The control circuit generates first and second drive pulses to drive the first and second drive circuits, respectively. The control circuit has a current detecting circuit and a phase difference adjuster. The current detecting circuit detects the first and second alternating currents separately. The phase difference adjuster adjusts a phase difference between the first and second drive pulses so that an amount of the first alternating current is identical to an amount of the second alternating current.

BRIEF DESCRIPTION OF THE DRAWINGS

The particular features and advantages of the invention as well as other objects will become apparent from the following description taken in connection with the accompanying drawings, in which:

FIGS. 6A and 6B are wave charts showing a relationship between an output of an oscillator and detecting periods for each current.

DESCRIPTION OF THE EMBODIMENT

An embodiment according to the present invention will be described below with reference to the accompanying drawings.

Figure 1:
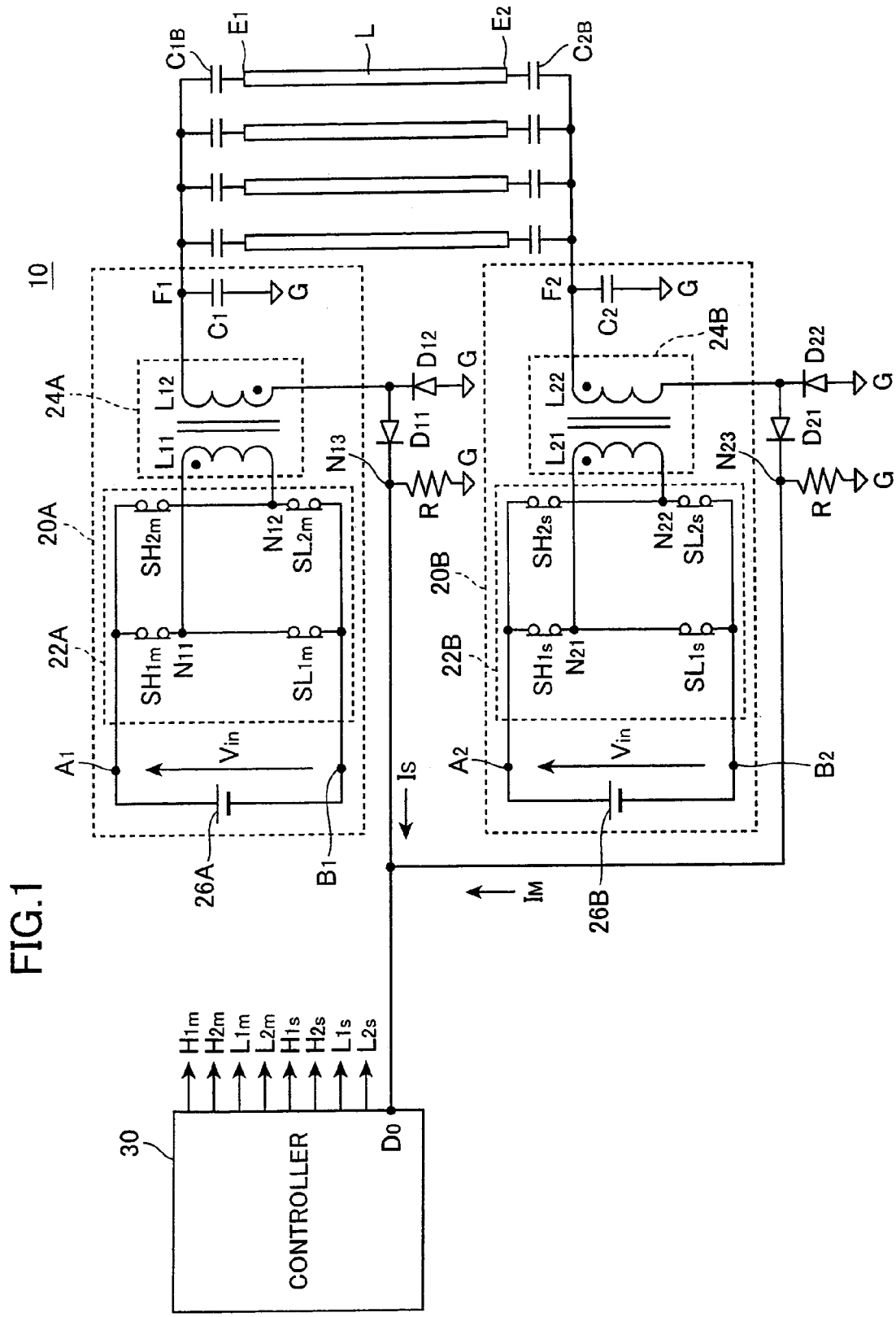
FIG. 1 shows a block diagram of a discharge lamp lighting device of one embodiment according to the present invention.

FIG. 1 shows a discharge lamp lighting device 10 according to an embodiment of the present invention. The discharge lamp lighting device 10 feeds electric power from a power supply to a discharge lamp L to light the discharge lamp L. The discharge lamp lighting device 10 includes a master circuit 20A, a slave circuit 20B, and a controller 30. The discharge lamp L controlled by the discharge lamp lighting device 10 is a CCFL that has electrodes $E_1$, $E_2$ at both ends thereof, respectively.

The master circuit 20A includes a first inverter circuit 22A, a first transformer 24A, and a first resonant capacitor $C_1$. A direct-current (DC) power supply 26A is connected to input terminals $A_1$, $B_1$ of the first inverter circuit 22A, so that a DC voltage $V_{in}$ from the DC power supply 26A is applied across the first inverter circuit 22A. The terminal $B_1$ is positioned at a lower potential than the terminal $A_1$.

The first inverter circuit 22A is a full-bridge type of inverter having four switching elements $SH_{1m}$, $SL_{1m}$, $SH_{2m}$, and $SL_{2m}$. The switching elements $SH_{1m}$, $SL_{1m}$ are connected in series between input terminals $A_1$, $B_1$. The switching elements $SH_{1m}$ is positioned at a higher potential than the switching elements $SL_{1m}$. The switching elements $SH_{2m}$, $SL_{2m}$ are connected in series between the input terminals $A_1$, $B_1$. The switching elements $SH_{2m}$ is positioned at a higher potential than the switching elements $SL_{2m}$. The connecting point $N_{11}$ between the switching elements $SH_{1m}$, $SL_{1m}$ and the connecting point $N_{12}$ between the switching elements $SH_{2m}$, $SL_{2m}$ are a pair of output terminals of the first inverter circuit 22A. In this embodiment, the switching elements $SH_{1m}$, $SL_{1m}$, $SH_{2m}$, and $SL_{2m}$ are configured by semiconductor switching elements such as field-effect transistors. The switching operations of the switching elements $SH_{1m}$, $SL_{1m}$, $SH_{2m}$, and $SL_{2m}$ are controlled by control signals $H_{1m}$, $H_{2m}$, $L_{1m}$, and $L_{2m}$ supplied from the controller 30, respectively. When supplied with the control signal having a high level, the switching element turns on. When supplied with the control signal having a low level, the switching element turns off.

The first transformer 24A includes a primary coil $L_{11}$ and a secondary coil $L_{12}$ which are wound in the manner that the polarity of the primary coil $L_{11}$ is oriented in the opposite direction to the polarity of the secondary coil $L_{12}$. The primary coil $L_{11}$ has two connecting ends connected to the output terminals $N_{11}$, $N_{12}$ of the first inverter circuit 22A, respectively. The secondary coil $L_{12}$ is connected to a reference potential G through one connecting end thereof, a diode $D_{11}$, a node $N_{13}$, and a resistor R. The diode $D_{11}$ and the resistor R are connected in series. The diode $D_{11}$ has an anode connected to the one connecting end of the secondary coil $L_{12}$, and a cathode connected to the node $N_{13}$. A current passes from the connecting end of the secondary coil $L_{12}$ to the reference potential G through the diode $D_{11}$ and the resistor R. The resistor R has a higher potential terminal connected to a current detecting terminal $D_0$ of the controller 30. A diode $D_{12}$ is connected between the secondary coil $L_{12}$ and the reference potential G. The diode $D_{12}$ has an anode connected to the reference potential G and a cathode connected to the one connecting end of the secondary coil $L_{12}$.

The first resonant capacitor $C_1$ is connected in parallel to the secondary coil $L_{12}$. One end of the first resonant capacitor $C_1$ is connected to the reference potential G. The first resonant capacitor $C_1$ has another end connected to another connecting end of the secondary coil $L_{12}$. A node between the first resonant capacitor $C_1$ and the secondary coil $L_{12}$ is an output terminal $F_1$ of the master circuit 20A. The output terminal $F_1$ is electrically connected to the discharge lamp L through a ballast capacitor $C_{1B}$ and the electrode $E_1$. The master circuit 20A supplies a first alternating current $I_M$ through the output terminal $F_1$ to the discharge lamp L.

The slave circuit 20B includes a second inverter circuit 22B, a second transformer 24B, and a second resonant capacitor $C_2$. A DC power supply 26B is connected to input terminals $A_2$, $B_2$ of the second inverter circuit 22B, so that a DC voltage $V_{in}$ from the DC power supply 26B is applied across the second inverter circuit 22B. The terminal $B_2$ is positioned at a lower potential than the terminal $A_2$.

The second inverter circuit 22B is a full-bridge type of inverter having four switching elements $SH_{1s}$, $SL_{1s}$, $SH_{2s}$, and $SL_{2s}$. The switching elements $SH_{1s}$, $SL_{1s}$ are connected in series between input terminals $A_2$, $B_2$. The switching elements $SH_{1s}$ is positioned at a higher potential than the switching elements $SL_{1s}$. The switching elements $SH_{2s}$, $SL_{2s}$ are connected in series between the input terminals $A_2$, $B_2$. The switching elements $SH_{2s}$ is positioned at a higher potential than the switching elements $SL_{2s}$. The connecting point $N_{21}$ between the switching elements $SH_{1s}$, $SL_{1s}$ and the connecting point $N_{22}$ between the switching elements $SH_{2s}$, $SL_{2s}$ are a pair of output terminals of the second inverter circuit 22B. In this embodiment, the switching elements $SH_{1s}$, $SL_{1s}$, $SH_{2s}$, and $SL_{2s}$ are configured by semiconductor switching elements such as field-effect transistors. The switching operations of the switching elements $SH_{1s}$, $SL_{1s}$, $SH_{2s}$, and $SL_{2s}$ are controlled by control signals $H_{1s}$, $H_{2s}$, $L_{1s}$, and $L_{2s}$ supplied from the controller 30, respectively. When supplied with the control signal having a high level, the switching element turns on. When supplied with the control signal having a low level, the switching element turns off.

The second transformer 24B includes a primary coil $L_{21}$ and a secondary coil $L_{22}$ which are wound in the manner that the polarity of the primary coil $L_{21}$ is oriented in the same direction to the polarity of the secondary coil $L_{22}$. The primary coil $L_{21}$ has two connecting ends which are connected to the output terminals $N_{21}$, $N_{22}$ of the second inverter circuit 22B, respectively. The secondary coil $L_{22}$ is connected to the reference potential G through one connecting end thereof, a diode $D_{21}$, a node $N_{23}$, and a resistor R. The diode $D_{21}$ and the resistor R are connected in series. The diode $D_{21}$ has an anode connected to the one connecting end of the secondary coil $L_{22}$, and a cathode connected to the node $N_{23}$. A current passes from the connecting end of the secondary coil $L_{22}$ to the reference potential G through the diode $D_{21}$ and the resistor R. The resistor R has a higher potential end connected to the current detecting terminal $D_0$ of the controller 30. A diode $D_{22}$ is connected between the secondary coil $L_{22}$ and the reference potential G. The diode $D_{22}$ has an anode connected to the reference potential G and a cathode connected to the one connecting end of the secondary coil $L_{22}$. In this embodiment, the resistor R of the master circuit 20A has the same resistance value as that of the slave circuit 20B.

The second resonant capacitor $C_2$ is connected in parallel to the secondary coil $L_{22}$. One end of the second resonant capacitor $C_2$ is connected to the reference potential. The second resonant capacitor $C_2$ has another end connected to another connecting end of the secondary coil $L_{22}$. A node between the second resonant capacitor $C_2$ and the secondary coil $L_{22}$ is an output terminal $F_2$ of the slave circuit 20B. The output terminal $F_2$ is electrically connected to the discharge lamp L through a ballast capacitor $C_{2B}$ and the electrode $E_2$. The slave circuit 20B supplies a second alternating current $I_S$ through the output terminal $F_2$ to the discharge lamp L.

The controller 30 is configured with a digital circuit. The controller 30 detects the first and second currents $I_M$, $I_S$ through the current detecting terminal $D_0$, and controls an amount of the current supplied from each of the master circuit 20A and the slave circuit 20B.

Figure 2:
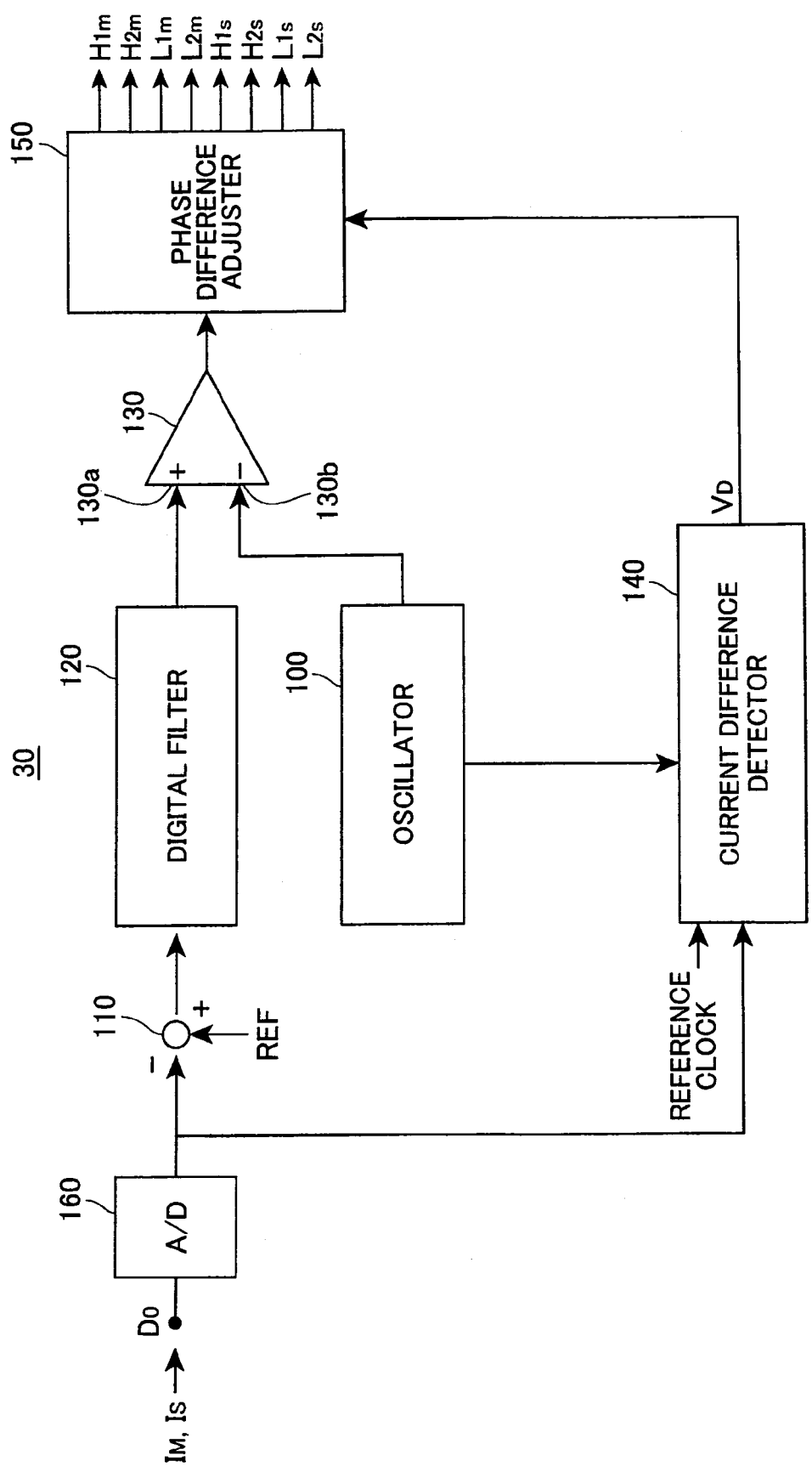
FIG. 2 is a circuit diagram showing a controller in detail.

FIG. 2 shows a circuit diagram of the controller 30. Referring to FIG. 2, the controller 30 includes an oscillator 100, a subtractor 110, a digital filter 120, a comparator 130, a current difference detector 140, a phase difference adjuster 150, and an analog-digital (A/D) converter 160.

The oscillator 100 generates a chopping wave having a period $T_0$ to supply the chopping wave to the comparator 130 and the current difference detector 140.

The A/D converter 160 is connected to the detecting terminal $D_0$. The A/D converter 160 converts a detected level of each of the first and second currents $I_M$, $I_S$ to a digital signal having the corresponding level. The A/D converter 160 then supplies the digital signal to the subtractor 110.

The subtractor 110 is connected to the A/D converter 160 to subtract an output of the A/D converter 160 from a reference value REF. In this embodiment, the reference value REF corresponds to a target AC current value to be flowed into the discharge lamp L.

The digital filter 120 is connected to the output side of the subtractor 110 to perform digital processing on the output of the subtractor 110. The digital filter 120 then supplies the output to a non-inverted terminal 130a of the comparator 130.

The comparator 130 receives the output of digital filter 120 through the non-inverted terminal 130a. The comparator 130 also receives the chopping wave generated by the subtractor 110 through an inverted terminal 130b thereof. The comparator 130 has an output terminal connected to the phase difference adjuster 150.

The current difference detector 140 detects a signal having the corresponding level to the amount of each of the first and second currents $I_M$, $I_S$. The current difference detector 140 then calculates a difference between the first and second currents $I_M$, $I_S$ to generate an output signal $V_D$ having a level corresponding to the difference to the phase difference adjuster 150.

The phase difference adjuster 150 receives outputs of the comparator 130 and the current difference detector 140. based on these received outputs, the phase difference adjuster 150 sets a duration and time-intervals for the switching operation for the switching elements in the master and slave circuits 22A, 22B to generates the control signals $H1_m$, $H2_m$, $L1_m$, $L2_m$, $H1_s$, $H2_s$, $L1_s$, and $L2_s$ based on the above set duration and time-intervals. Accordingly, the phase difference adjuster 150 causes the switching elements in the master and slave circuits 22A, 22B to perform the switching operation.

Figure 3:
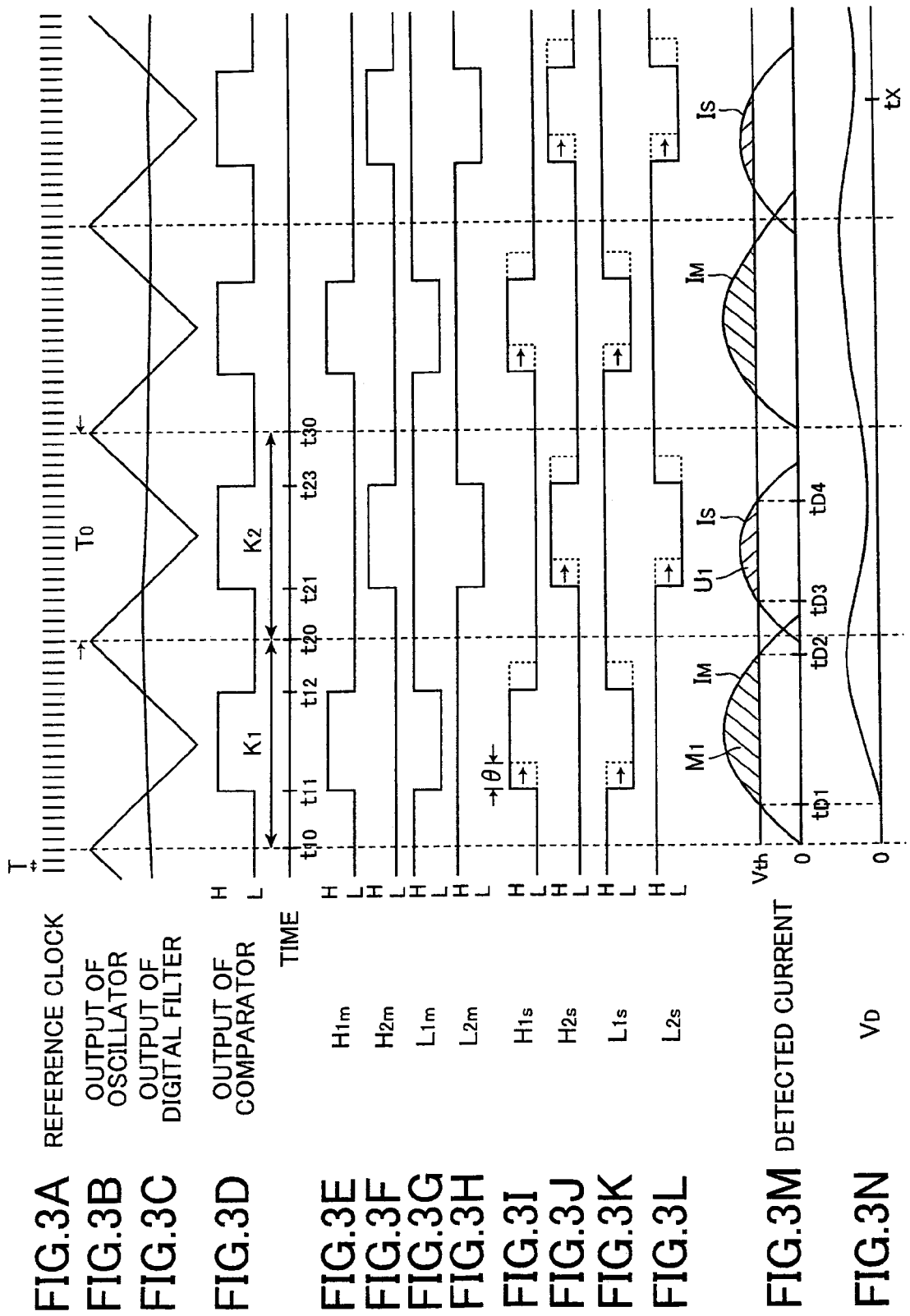
FIGS. 3A-3N show wave forms of each control signal for driving the discharge lamp lighting device, first and second AC current, and an output signal for a phase difference adjuster 250.

The next description will be made for explaining an operation of the discharge lamp lighting device 10, referring to FIGS. 1-3. The operation of the discharge lamp lighting device 10 is based on reference clocks having a high frequency of a cycle T generated in the controller 30 (See FIG. 3A). In the controller 30, the oscillator 100 generates chopping waves having a longer cycle of $T_0$ than the cycle T to supply the chopping waves to the inverted-terminal 130b of the comparator 130 (See FIG. 3B). The current passing through the discharge lamp lighting device 10 is converted to a current signal having a corresponding level by the resistor R, thereby entering into the controller 30 through the current detecting terminal $D_0$. The current signal is processed by the subtractor 110 and the digital filter 120 (See FIG. 3C) to be supplied to the comparator 130 through the non-inverted terminal 130a. The comparator 130 generates a LOW signal if the instantaneous level of the chopping wave is more than the output of the digital filter 120. The comparator 130 generates a HIGH signal when the instantaneous level of the chopping wave is less than the output of the digital filter 120 (See FIG. 3D). The phase difference adjuster 150 generates the control signals $H_{1m}$, $H_{2m}$, $L_{1m}$, and $L_{2m}$ for the master circuit 20A, and the control signals $H_{1s}$, $H_{2s}$, $L_{1s}$, and $L_{2s}$ for the slave circuit 20B in accordance with the output level of the comparator 130 (See FIGS. 3E-3L).

When the master circuit 20A receives the control signals $H_{1m}$, $H_{2m}$, $L_{1m}$, and $L_{2m}$ for the switching elements $SH_{1m}$, $SL_{1m}$, $SH_{2m}$, and $SL_{2m}$ from the controller 30, the first inverter circuit 22A converts the input DC voltage $V_{in}$ to a higher-frequency AC voltage to supply the converted AC voltage to the first transformer 24A. The first transformer 24A converts a voltage level of the input to generate the first AC current $I_M$ through the terminal $F_1$. The first AC current $I_M$ passes into the discharge lamp L through the electrode $E_1$. The first AC current $I_M$ is converted to a current signal having a corresponding level of the first AC current $I_M$ by the resistor R of the slave circuit 20B.

Similarly, when the slave circuit 20B receives the control signals $H_{1s}$, $H_{2s}$, $L_{1s}$, and $L_{2s}$ for the switching elements $SH_{1s}$, $SL_{1s}$, $SH_{2s}$, and $SL_{2s}$ from the controller 30, the second inverter circuit 22B converts the input DC voltage $V_{in}$ to a higher-frequency AC voltage to supply the AC voltage to the second transformer 24B. The second transformer 24B converts a voltage level of the input to generate the second AC current $I_S$ through the terminal $F_2$. The second AC current $I_S$ passes into the discharge lamp L through the electrode $E_2$. The second AC current $I_S$ is converted to a current signal having a corresponding level of the second AC current $I_S$ by the resistor R of the master circuit 20A.

In the first transformer 24A, the primary coil and the secondary coil are wound so that the polarity of the primary coil is opposite to that of the secondary coil. In the second transformer 24B, the primary coil and the secondary coil are wound so that the polarities of the primary and secondary coils are oriented in the same direction. Accordingly, when the switching operation of the master circuit 20A is substantially synchronized with the switching operation of the slave circuit 20B, the first and second AC currents $I_M$, $I_S$ alternately flows in the discharge lamp lighting device 10 to light the discharge lamp L (See FIG. 3M).

The next description will be made for explaining a method to detect the first and second AC currents $I_M$, $I_S$. During a period $K_1$ from a time $t_{10}$ to a time $t_{20}$ having a duration corresponding to one cycle $T_0$ of the chopping wave, when the switching elements $SH_{1m}$, $SL_{2m}$ turn on, and at least one of the switching elements $SL_{1m}$, $SH_{2m}$ turns off in response to the control signals $H_{1m}$, $H_{2m}$, $L_{1m}$, and $L_{2m}$, the current flows to the discharge lamp L through the output terminal $F_1$. In the same period, when the switching elements $SH_{1S}$, $SL_{2S}$ turn on, and at least one of the switching elements $SL_{1S}$, $SH_{2S}$ turns off in response to the control signals $H_{1S}$, $H_{2S}$, $L_{1S}$, and $L_{2S}$ in the slave circuit 20B, the current flows in the slave circuit 20B from the discharge lamp L through the output terminal $F_2$. Accordingly, during the period $K_1$, the current flows from the master circuit 20A to the slave circuit 20B through the discharge lamp L, so that the controller 30 determines the current entering the current detecting terminal $D_0$ as the first AC current $I_M$.

During the period $K_1$, the current difference detector 140 compares the first AC current $I_M$ entering the current detecting terminal $D_0$ with the threshold $V_{th}$ having a predetermined level at every reference clock. Then, the period in which $I_M$ is more than $V_{th}$, i.e., the time period from the time $T_{D1}$ to the time $T_{D2}$ is referred as the first period. During the first period, the current difference detector 140 calculates a difference between the instantaneous level of the first AC current $I_M$ and the threshold $V_{th}$; $(I_M-V_{th})$ and sums the difference at every reference clock, thereby sending the sum of the differences as an output signal $V_D$ of the current difference detector 140 to the phase difference adjuster 150 (See FIG. 3N).

During the period $K_2$ following the period $K_1$ from a time $t_{20}$ to a time $t_{30}$ and having a duration corresponding to one cycle $T_0$ of the chopping wave, when the switching elements $SL_{1m}$, $SH_{2m}$ turn on, and at least one of the switching elements $SH_{1m}$, $SL_{2m}$ turns off in response to the control signals $H_{1m}$, $H_{2m}$, $L_{1m}$, and $L_{2m}$ in the master circuit 20A, the current flows in the master circuit 20A from the discharge lamp L through the output terminal $F_1$. In the same period, when the switching elements $SH_{2S}$, $SL_{1S}$ turn on, and at least one of the switching elements $SL_{2S}$, $SH_{1S}$ turns off in response to the control signals $H_{1S}$, $H_{2S}$, $L_{1S}$, and $L_{2S}$ in the slave circuit 20B, the current flows out to the discharge lamp L through the output terminal $F_2$. Accordingly, during the period $K_2$, the current flows from the slave circuit 20B to the master circuit 20A through the discharge lamp L, so that the controller 30 determines the current entering the current detecting terminal $D_0$ as the second AC current $I_S$.

During the period $K_2$, the current difference detector 140 compares the second AC current $I_S$ entering the current detecting terminal $D_0$ with the threshold $V_{th}$ having the predetermined level at every reference clock. Then, the period in which $I_S$ is more than $V_{th}$, i.e., the time period from the time $T_{D3}$ to the time $T_{D4}$ is referred as the second period. During the second period, the current difference detector 140 calculates a difference between the instantaneous level of the second AC current $I_S$ and the threshold $V_{th}$; ($I_S-V_{th}$), and subtracts the corresponding level to the difference from the output signal $V_D$ at every reference clock, thereby sending the resultant output signal $V_D$ to the phase difference adjuster 150 (See FIG. 3N).

When the discharge lamp lighting device 10 lights the discharge lamp L in the above described manner, the period $K_1$ in which the first AC current $I_M$ flows in the discharge lamp L from master circuit 20A, and the period $K_2$ in which the second AC current $I_S$ flows in the discharge lamp L from the slave circuit 20B alternatively appears periodically, as time passes. The controller 30 determines based on the control signals to each inverter circuits 22A, 22B which the master circuit 20A or the slave circuit 20B supplies the current passing through the discharge lamp L.

The output signal $V_D$ of the current difference detector 140 has a level which is substantially identical to the actual accumulated difference between the first AC current $I_M$ and the second AC current $I_S$ during the period from the starting time of the differential drive method for the discharge lamp L by the discharge lamp lighting device 10 to any given time $t_x$.

Accordingly, at the time $t_x$, if the output signal $V_D$ has a positive level, the phase difference adjuster 150 determines that the amount of the first AC current $I_M$ is more than the amount of the second AC current $I_S$. Then, The phase difference adjuster 150 adjusts a phase difference $\theta$ between the control signals $H_{1m}$, $H_{2m}$, $L_{1m}$, and $L_{2m}$ and the control signals $H_{1S}$, $H_{2S}$, $L_{1S}$, and $L_{2S}$ to a value proportional to the level of the output signal $V_D$ in order to decrease the level of the output signal $V_D$ to zero. Therefore, a leading edge and a trailing edge of each of the control signals $H_{1S}$, $H_{2S}$, $L_{1S}$, and $L_{2S}$ for the slave circuit 20B are delayed by the time corresponding to the phase difference $\theta$ (See FIGS. 3I-3L). When the phase difference $\theta$ is adjusted in the above manner, the amount of the first AC current $I_M$ is decreasing, while the amount of the second AC current $I_S$ is increasing. Accordingly, the amount of the first AC current $I_M$ becomes equal to the amount of the second AC current $I_S$.

On the other hand, if the output signal $V_D$ has a negative level, the phase difference adjuster 150 determines that the amount of the first AC current $I_M$ is less than the amount of the second AC current $I_S$. Then, The phase difference adjuster 150 adjusts a phase difference $\theta$ between the control signals $H_{1m}$, $H_{2m}$, $L_{1m}$, and $L_{2m}$ and the control signals $H_{1S}$, $H_{2S}$, $L_{1S}$, and $L_{2S}$ to a value proportional to the level of the output signal $V_D$ in order to increase the level of the output signal $V_D$ to zero. Therefore, a leading edge and a trailing edge of each of the control signals $H_{1m}$, $H_{2m}$, $L_{1m}$, and $L_{2m}$ for the master circuit 20A are advanced by the time corresponding to the phase difference $\theta$. When the phase difference $\theta$ is adjusted in the above manner, the amount of the first AC current $I_M$ is increasing, while the amount of the second AC current $I_S$ is decreasing. Accordingly, the amount of the first AC current $I_M$ becomes equal to the amount of the second AC current $I_S$.

The output signal $V_D$ increases when the amount of the first AC current $I_M$ is more than the amount of the second AC current $I_S$. The output signal $V_D$ decreases when the amount of the second AC current $I_S$ is more than the amount of the first AC current $I_M$. Based on the current level of the output signal $V_D$, the level of the output signal $V_D$ is converged to a constant value, for example zero, by adjusting the phase differences between the control signals $H_{1m}$, $H_{2m}$, $L_{1m}$, and $L_{2m}$ and the control signals $H_{1s}$, $H_{2s}$, $L_{1s}$, and $L_{2s}$. In other words, the root-mean-square (rms) value of the first AC current $I_M$ can be adjusted to become equal to the rms of the second AC current $I_S$.

As described above, the controller 30 detects the first AC current $I_M$ and the second AC current $I_S$ separately to perform the phase control for the master circuit 20A and the slave circuit 20B, thereby eliminating the difference between the first AC current $I_M$ and the second AC current Is Therefore, the first AC current $I_M$ can become identical to the second AC current $I_S$.

In this embodiment, in the period $K_1$, the first AC current $I_M$ has accumulated from the time $t_{D1}$ at which the first AC current $I_M$ exceeds the threshold $V_{th}$ to the time $t_{D2}$ at which the first AC current $I_M$ drops down from the threshold $V_{th}$ to obtain the accumulated amount of the current as the first accumulated amount of current (see FIG. 3M, region $M_1$). In the next period $K_2$, the second AC current $I_S$ has accumulated from the time $t_{D3}$ at which the second AC current $I_S$ exceeds the threshold $V_{th}$ to the time $t_{D4}$ at which the second AC current $I_S$ drops down from the threshold $V_{th}$ to obtain the accumulated amount of the current as the second accumulated amount of current (see FIG. 3M, region $U_1$). The difference between the first accumulated amount of current and the second accumulated amount of current is generated as the output signal $V_D$. Based on the level of the output signal $V_D$, the controller 30 performs the phase control for the master circuit 20A and the slave circuit 20B.

As described above, the current supplied from the master circuit 20A to the discharge lamp L can be balanced with the current supplied from the slave circuit 20B to the discharge lamp L.

The discharge lamp lighting device 10 of FIG. 1 includes four diodes $D_{11}$, $D_{12}$, $D_{21}$, and $D_{22}$ so that the controller 30 can distinguish the first AC current $I_M$ from the second AC current $I_S$ at the current detecting terminal $D_0$ by using the control signals for inverter circuits and the chopping waves for generating the control signals. Therefore, there is no need to provide two separate current detecting terminals for the first and second AC currents, respectively. Accordingly, the discharge lamp lighting device 10 can be made compact. The discharge lamp lighting device 10 can accomplish a downsize of the internal circuits when the controller 30 is configured by ICs, power-saving effect, and cost-down for the manufacturing.

In this embodiment, the first AC current $I_M$ and the second AC current $I_S$ may overlap at a given time because the controller 30 performs a phase-control for the master circuit 20A and the slave circuit 20B. If the threshold is set to zero, the controller 30 cannot sometimes distinguish the first AC current $I_M$ and the second AC current $I_S$. Therefore, it is preferable that the threshold $V_{th}$ has any level other than zero to ensure the distinction between the first AC current $I_M$ and the second AC current $I_S$.

The amount of first current is compared with the amount of second currents when the instantaneous value of the current exceeds the threshold. This comparison is equal to another case in which the first AC current $I_M$ is compared with the second AC current $I_S$ without the threshold assuming that the first AC current $I_M$ can be completely distinguishable with the second AC current $I_S$. However, the first AC current $I_M$ and the second AC current $I_S$ may overlap depending on the phase difference $\theta$. Accordingly, the usage of the threshold contributes to more precise distinction between the first AC current $I_M$ and the second AC current $I_S$.

As described above, when the AC currents entering into the discharge lamp L through two electrodes respectively become substantially equal, the AC electric power supplied into the discharge lamp L from two electrodes become substantially equal. Accordingly, the discharge lamp L can emit light uniformly along the longitudinal direction thereof.

Figure 4:
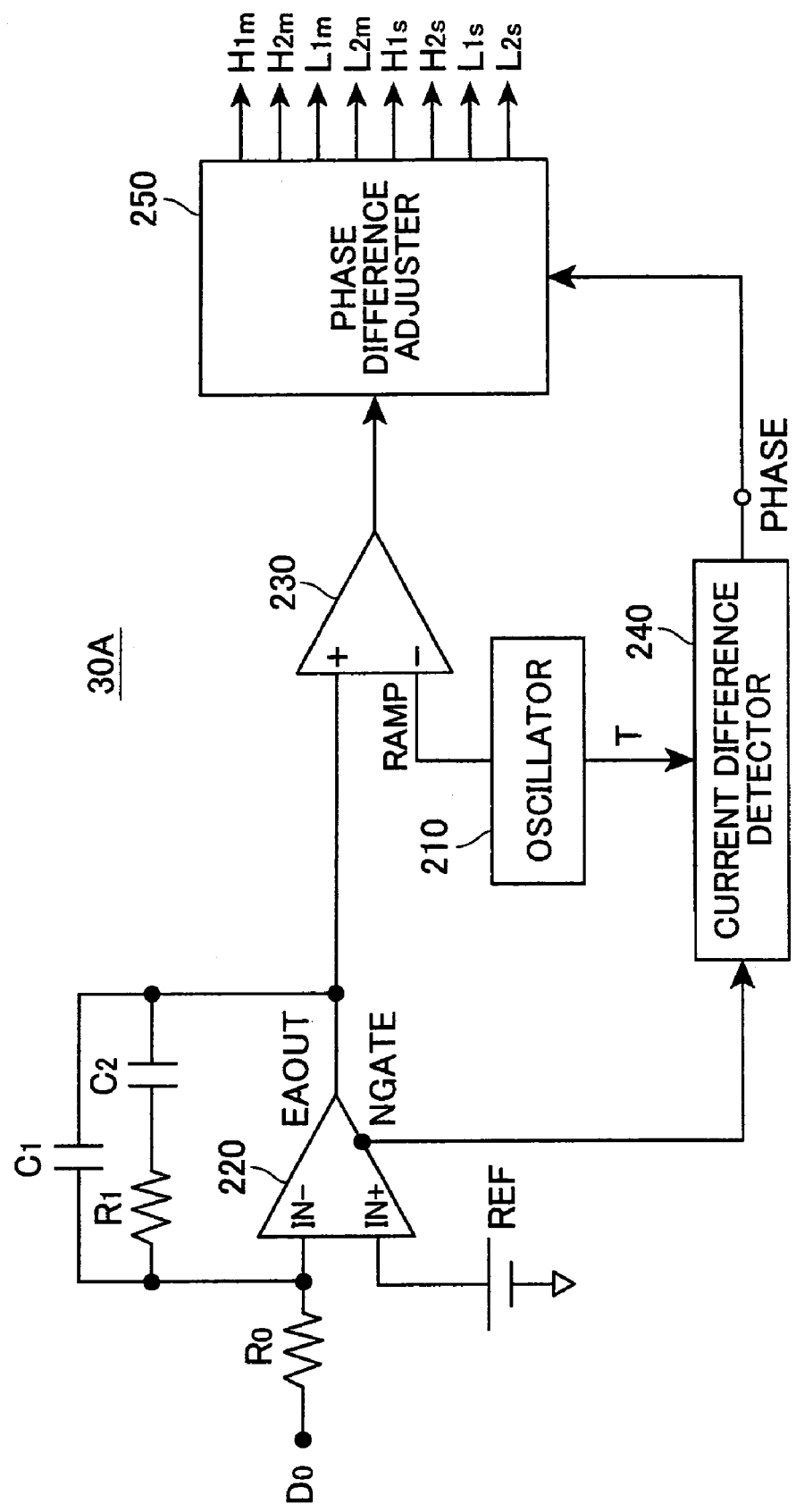
FIG. 4 is a circuit diagram showing another structure of the controller.

FIG. 4 shows anther structure of the controller 30 constituted by an analog circuit. The controller 30A of FIG. 4 includes an oscillator 210, an operational amplifier 220, a comparator 230, a current difference detector 240, and a phase difference adjuster 250.

The oscillator 210 generates chopping waves RAMP having a predetermined period $T_0$ to supply the chopping waves RAMP to the comparator 230. The oscillator 210 generates a rectangular wave signal T synchronized with the chopping waves RAMP to the current difference detector 240.

The operational amplifier 220 has an inverted input terminal connected to the current detecting terminal $D_0$ through a resistor $R_0$ and a non-inverted input terminal connected to the reference potential REF. The operational amplifier 220 has an output terminal EAOUT connected to one of the input terminals of the comparator 230 and an NGATE terminal connected to the current difference detector 240. A capacitor $C_1$ is connected between the inverted input terminal and the output terminal of the operational amplifier 220. Series-connected resistor $R_1$ and capacitor $C_2$ are connected in parallel to the capacitor $C_1$. Accordingly, the operational amplifier 220 amplifies the difference between the input voltage supplied from the current detecting terminal $D_0$ and the reference voltage REF to generate the amplified signal to the comparator 230.

The comparator 230 has one input terminal connected to the operational amplifier 220, the other input terminal connected to the oscillator 210, and an output terminal connected to the phase difference adjuster 250.

The current difference detector 240 has an input terminal connected to the operational amplifier 220 to receive the proportional voltage to a sink current of the output voltage of the operational amplifier 220 through the NGATE terminal. The current difference detector 240 processes the input voltage with the rectangular wave signal T supplied from the oscillator to generate a phase difference setting signal PHASE which is proportional to the difference between the first AC current $I_M$ and the second AC current $I_S$ to the phase difference adjuster 250.

The phase difference adjuster 250 receives the output from the comparator 230 and the current difference detector 240. Based on these input signals, the phase difference adjuster 250 adjusts the durations and timings of the switching operation for the switching elements in each inverter circuits 22A, 22B to transfer these adjusted matters to the respective switching element as the corresponding control signals $H_{1m}$, $H_{2m}$, $L_{1m}$, $L_{2m}$, $H_{1s}$, $H_{2s}$, $L_{1s}$, and $L_{2s}$. Accordingly, the phase difference adjuster 250 causes each inverter circuit 22A, 22B to perform a desired switching operation.

Figure 5:
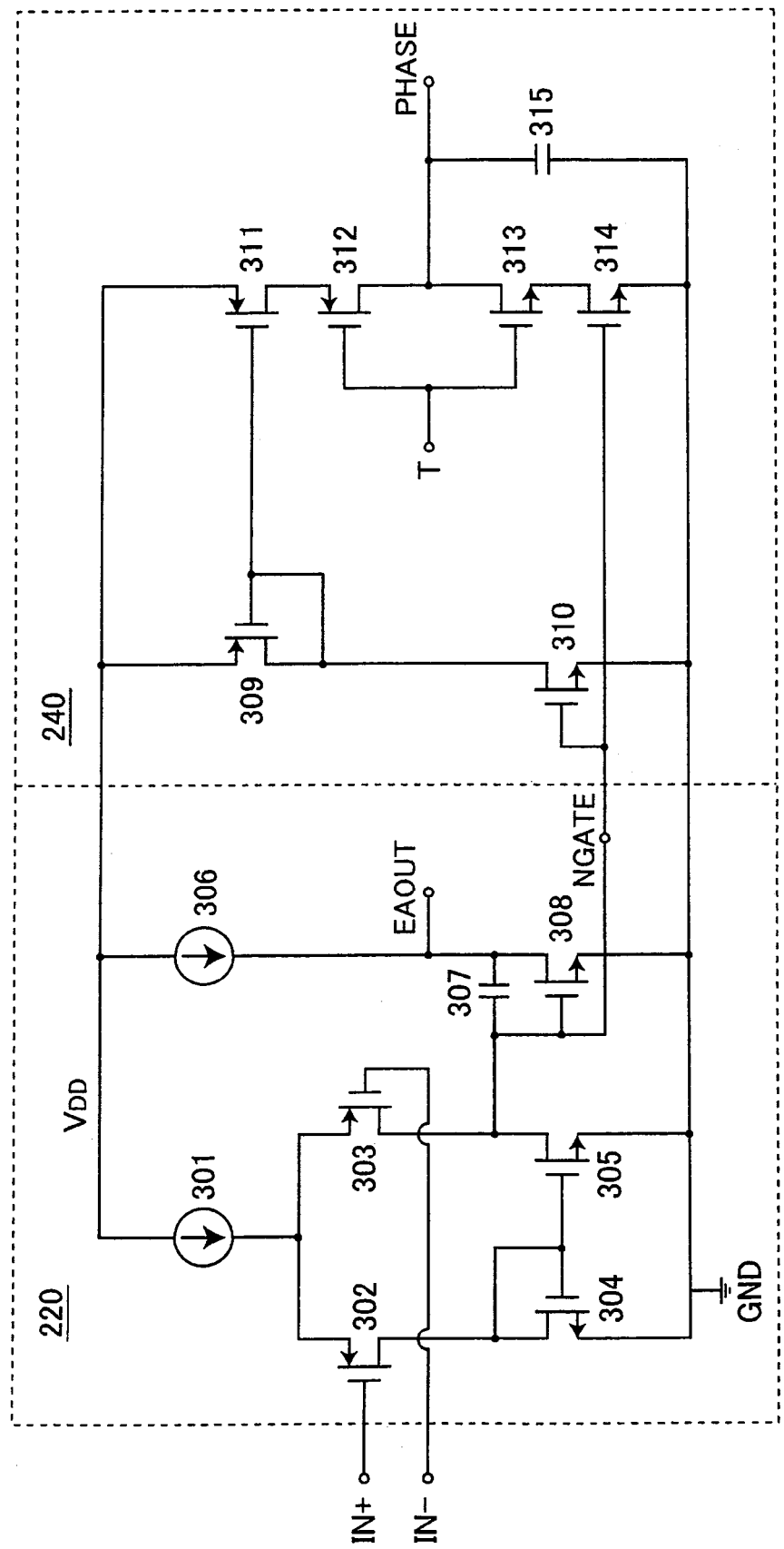
FIG. 5 is a circuit diagram showing an operational amplifier 220 and a current difference detector 240 in detail.

Referring to FIG. 5, the operational amplifier 220 and the current difference detector 240 will described in detail. In the operational amplifier 220, the inverted and non-inverted terminals of are connected to gates of transistors 303, 302, respectively. At the output terminal EAOUT, a current is sourced from a power supply 306, and the current is sank by a transistor 308. A gate of the transistor 308 is connected to the output terminal NGATE.

In the current difference detector 240, the NGATE terminal is connected to gates of transistors 310, 314. Referring to FIG. 6, when the rectangular wave signal T has a low level, the detecting period is for detecting the first AC current $I_M$, and referred as a period $K_1$. When the rectangular wave signal T has a high level, the detecting period is for detecting the second AC current $I_S$, and referred as a period $K_2$. In the period in which T shows a low level and the transistor 308 is sinking, the capacitor 315 is charged with a current which is proportional to the sink current of the transistor 308 and passes through a transistor 312.

While the transistor 308 is sinking at the high level of T, the capacitor 315 is discharged through a transistor 313 by the amount of current which is proportional to the sink current of the transistor 308. In a period in which the transistor 308 does not sink, the voltage level at the current detecting terminal $D_0$ is lower than the reference voltage REF. Accordingly, the capacitor 315 is neither charged nor discharged. The voltage across the capacitor 315 is equal to the voltage appearing at the PHASE terminal. When $I_M > I_S$, the voltage across the capacitor 315 increases. When $I_M < I_S$, the voltage across the capacitor 315 decreases. Accordingly, when the phase difference adjuster 250 adjusts the phase difference θ, the current difference between the first AC current $I_M$ and the second AC current $I_S$ is adjusted to obtain that $I_M = I_S$.

Instead of the AC power supply described above, the discharge lamp lighting device 10 may include an AC power supply. In this case, an AC voltage supplied from the AC power supply can be applied to each inverter circuits 20A, 20B through rectifier circuit. The ballast capacitors may eliminated depending on the application of the discharge lamp lighting device 10.

In the above described embodiments, it is preferable that the difference between the first AC current and the second AC current is within 2% of each of the first and second currents.

Further, in the above embodiments, the first AC current becomes substantially the same as the second AC current. Accordingly, the discharge lamp L can emit light uniformly along the longitudinal direction thereof. In addition, derating of each of the master and slave circuits can be identical to each other.

Further, power control for lighting the discharge lamp by the differential drive method can be performed more precisely, because the first AC current is compared with the second AC current by using the integral amount of each current during a predetermined period.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. A discharge lamp lighting apparatus for lighting a discharge lamp having two electrodes, comprising:
   a first drive circuit connectable to one of the two electrodes to supply a first alternating current to the discharge lamp, the first alternating current having a frequency;
   a second drive circuit connectable to the other of the two electrodes to supply a second alternating current to the discharge lamp, the second alternating current having the same frequency as the first alternating current; and
   a control circuit for generating first and second drive pulses to drive the first and second drive circuits, respectively, wherein the control circuit comprises:

a current detecting circuit that detects the first and second alternating currents separately; and a phase difference adjuster that adjusts a phase difference between the first and second drive pulses so that an amount of the first alternating current is identical to an amount of the second alternating current.

2. The discharge lamp lighting apparatus according to claim 1, wherein the current detecting circuit calculates a first integral of current exceeding a threshold during a first period and a second integral of current exceeding the threshold during a second period, the first period being defined as a period from a first moment at which the first alternating current exceeds the threshold to a next second moment at which the first alternating current falls down from the threshold, the second period being defined as another period from a third moment at which the second alternating current exceeds the threshold to a next fourth moment at which the second alternating current falls down from the threshold, the phase difference adjuster adjusts the phase difference so that the first integral of current becomes identical to the second integral of current.

* * * * *